(12) United States Patent
Tagishi et al.

(10) Patent No.: US 10,039,176 B2
(45) Date of Patent: Jul. 31, 2018

(54) DISCHARGE LAMP LIGHTING DEVICE, LAMP FAILURE DETECTION METHOD, AND PROJECTOR

(71) Applicant: NEC Display Solutions, Ltd., Tokyo (JP)

(72) Inventors: Koichi Tagishi, Tokyo (JP); Hiroki Tanaka, Tokyo (JP); Yasuji Kawai, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/502,768

(22) PCT Filed: Sep. 30, 2014

(86) PCT No.: PCT/JP2014/076133
§ 371 (c)(1),
(2) Date: Feb. 8, 2017

(87) PCT Pub. No.: WO2016/051522
PCT Pub. Date: Apr. 7, 2016

(65) Prior Publication Data
US 2017/0231073 A1    Aug. 10, 2017

(51) Int. Cl.
*H05B 37/02* (2006.01)
*H05B 41/24* (2006.01)
(Continued)

(52) U.S. Cl.
CPC ............ *H05B 41/24* (2013.01); *H05B 41/16* (2013.01); *G03B 21/2053* (2013.01); *H05B 41/2925* (2013.01); *H05B 41/2928* (2013.01)

(58) Field of Classification Search
CPC ........... H05B 41/2928; H05B 41/2925; G03B 21/2053
(Continued)

(56) References Cited

U.S. PATENT DOCUMENTS

2004/0113567 A1* 6/2004 Yamauchi .......... H05B 41/2882
315/291
2009/0121640 A1* 5/2009 Ootsuka ............. H05B 41/2925
315/129
(Continued)

FOREIGN PATENT DOCUMENTS

CN       1414820 A    4/2003
CN     101799617 A    8/2010
(Continued)

OTHER PUBLICATIONS

International Search Report (ISR) (PCT Form PCT/ISA/210), in PCT/JP2014/076133, dated Dec. 22, 2014.
(Continued)

*Primary Examiner* — Thuy Vinh Tran
(74) *Attorney, Agent, or Firm* — McGinn IP Law Group, PLLC.

(57) ABSTRACT

A discharge lamp lighting device includes: a storage unit that stores information; a lamp drive unit that supplies drive power to the discharge lamp; a voltage detection unit that detects the lamp voltage of the discharge lamp; and a control unit that, on the basis of the voltage detection value supplied from the voltage detection unit, stores in the storage unit error log information that indicates the operating state of the discharge lamp when change of the lamp voltage indicates a predetermined voltage characteristic.

20 Claims, 15 Drawing Sheets

(51) Int. Cl.
*H05B 41/16* (2006.01)
*G03B 21/20* (2006.01)
*H05B 41/292* (2006.01)

(58) Field of Classification Search
USPC ... 315/209 R, 224, 225, 226, 291, 307, 308, 315/360
See application file for complete search history.

(56) References Cited

U.S. PATENT DOCUMENTS

2010/0320938 A1* 12/2010 Pollmann-Retsch  H05B 41/2928
                                                                    315/307
2011/0095696 A1*  4/2011 Okawa ............... H05B 41/2887
                                                                    315/287

FOREIGN PATENT DOCUMENTS

| JP | 2003-133091 A | 5/2003 |
| JP | 2007-213929 A | 8/2007 |
| JP | 2007-122996 A | 5/2009 |
| JP | 2010-182592 A | 8/2010 |
| WO | WO 03/047319 A1 | 6/2003 |

OTHER PUBLICATIONS

Japanese Notice of Decision to Grant a Patent, dated Jan. 16, 2018, in Japanese Application No. 2016-551395 and English Translation thereof.
Chinese Office Action, dated May 31, 2018, in Chinese Application No. 201480081968.X and English Translation thereof.

* cited by examiner

FIG. 2A

Lamp failure warning sign detection parameters

| Observation | Assumed fault mode | Cause | | | | | Abnormality time | Error detection parameters | |
|---|---|---|---|---|---|---|---|---|---|
| | | | | | | | | Time interval | Lamp voltage value |
| (1) Continuous voltage rise | Rupture or cracking originating in the outer surface, or swelling of arc tube | Darkening due to electrode wear (including migration of protrusion) → | Rise of arc tube temperature → | Accumulation of thermal strain → Swelling of arc tube | Cracking of arc tube | | Voltage increase of 30V or more over 100 hours (continuous increase) | 10 hours | 3V |
| (2) Steep voltage rise | Flicker | Loss of protrusion → | Drop in temperature of electrode tip → | Migration of bright spot → | Flicker | | Voltage increase of 20V or more over 20 hours (sudden increase) | 2 hours | 2V |

DISCHARGE LAMP LIGHTING DEVICE, LAMP FAILURE DETECTION METHOD, AND PROJECTOR

TECHNICAL FIELD

The present invention relates to the lighting device of a discharge lamp and to a lamp failure detection method.

BACKGROUND ART

A high-pressure discharge lamp is of a configuration in which a pair of electrodes are arranged opposite each other in an arc tube composed of quartz glass, a substance such as mercury being enclosed inside the arc tube. The lamp is lighted by supplying an alternating current to the pair of electrodes, and while lighted, an arc is maintained by a protrusion that is formed at the tip portion of each electrode. Further, the shape of the protrusion formed on the tip of each electrode main is maintained by carrying out an appropriate halogen cycle that accords with the high-voltage discharge lamp.

Typically, a discharge lamp lighting device is constructed to light a high-pressure discharge lamp by constant-power control (see Patent Document 1). This discharge lamp lighting device includes a DC/DC converter, a DC/AC inverter, a high-voltage generation unit, a current detection unit, a voltage detection unit, and a control unit.

The DC/DC converter converts the input direct-current voltage to direct-current voltage of a designated voltage value. The DC/AC inverter receives the direct-current voltage that is supplied from the DC/DC converter and generates an alternating-current square-wave current. The alternating-current square-wave current that is supplied from this DC/AC inverter is supplied to the discharge lamp by way of the high-voltage generation unit. The high-voltage generation unit generates a trigger voltage for use as the required dielectric breakdown at the time of starting ignition.

The voltage detection unit detects the voltage that is equivalent to the lamp voltage that is applied to the discharge lamp. The current detection unit detects the current that is equivalent to the lamp current that flows in the discharge lamp. The control unit calculates the lamp power on the basis of the lamp voltage that was detected in the voltage detection unit and the lamp current that was detected in the current detection unit and adjusts the output voltage of the DC/DC converter such that the lamp power becomes a predetermined power (for example, the rated power).

The above-described discharge lamp lighting device is provided in devices such as projectors, and many such products have already been introduced on the market.

LITERATURE OF THE PRIOR ART

Patent Documents

Patent Document 1: Japanese Unexamined Patent Application Publication No. 2003-133091

DISCLOSURE OF THE INVENTION

However, when lighting of a discharge lamp continues over a long time interval in the above-described discharge lamp lighting device, unwanted problems such as flicker or cracking and rupture of the arc tube may arise due to the temperature of the lamp or the state of the halogen cycle. Normally, products in which failures have occurred are recalled to identify the cause of the failure, but in most cases, identifying the cause of the failure of the lamp is problematic unless there is information indicating the operating state of the lamp during the process of experiencing a failure. Because a way to obtain such information is not provided in the above-described discharge lamp lighting device, the cause of the failure of the discharge lamp is difficult to identify.

It is an object of the present invention to provide a discharge lamp lighting device and lamp failure detection method that enable the identification of the cause of a failure of the discharge lamp and thus solve the above-described problem.

It is another object of the present invention to provide a projector that is equipped with this discharge lamp lighting device.

According to an aspect of the present invention for achieving the above-described object, a discharge lamp lighting device is provided that is a discharge lamp lighting device that controls lighting of a discharge lamp and that has:

a storage unit that stores information;
a lamp drive unit that supplies drive power to the discharge lamp;
a voltage detection unit that detects the lamp voltage of the discharge lamp; and
a control unit that, on the basis of the voltage detection value that is supplied from the voltage detection unit, stores in the storage unit error log information that indicates the operating state of the discharge lamp when change of the lamp voltage indicates a predetermined voltage characteristic.

According to another aspect of the present invention, a lamp failure detection method is provided that is a lamp failure detection method that is carried out in a discharge lamp lighting device that controls lighting of a discharge lamp and that has steps of:

detecting the lamp voltage of the discharge lamp, and on the basis of the voltage detection value, storing in a storage unit error log information that indicates the operating state of the discharge lamp when change of the lamp voltage indicates a predetermined voltage characteristic.

According to another aspect of the present invention for achieving the above-described object, a projector is provided that has:

a discharge lamp;
the above-described discharge lamp lighting device that lights the discharge lamp;
an image formation unit that spatially modulates the luminous flux from the discharge lamp on the basis of an input video signal to form an image; and
a projection optical system that projects the image formed in the image formation unit.

BRIEF DESCRIPTION OF THE DRAWINGS

FIG. 2A is a view for describing an example of the lamp failure warning sign detection parameters.

DESCRIPTION OF EMBODIMENT

Exemplary embodiments of the present invention are next described with reference to the accompanying drawings.

First Exemplary Embodiment

Figure 1:
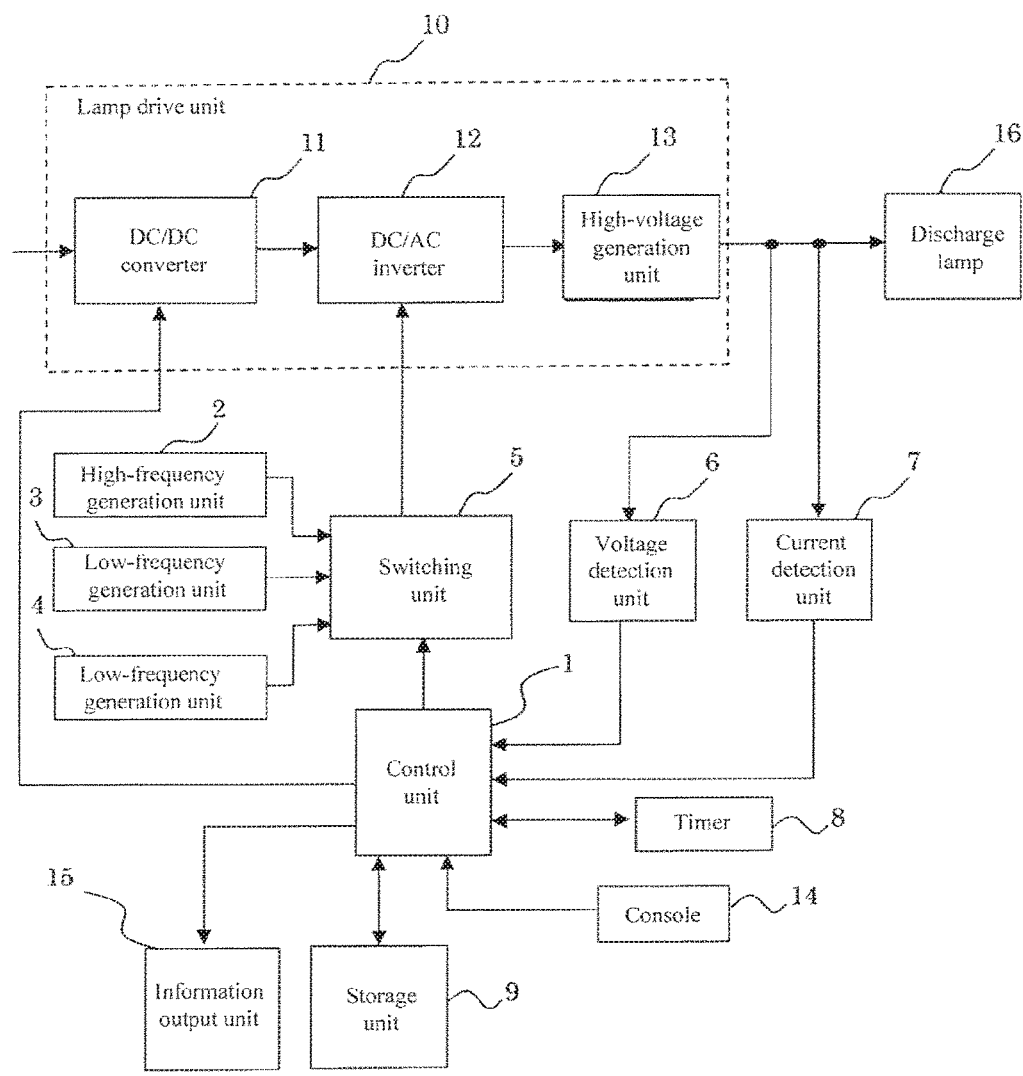
FIG. 1 is a block diagram showing the configuration of the discharge lamp lighting device according to the first exemplary embodiment of the present invention.

FIG. 1 is a block diagram showing the configuration of the discharge lamp lighting device according to the first exemplary embodiment of the present invention.

Referring to FIG. 1, the discharge lamp lighting device, which lights discharge lamp 16, includes: control unit 1, high-frequency generation unit 2, low-frequency generation units 3 and 4, switching unit 5, voltage detection unit 6, current detection unit 7, timer 8, storage unit 9, lamp drive unit 10, console 14, and information output unit 15. Lamp drive unit 10 includes DC/DC converter 11, DC/AC inverter 12, and high-voltage generation unit 13.

Discharge lamp 16 is a high-pressure discharge lamp, a representative example being an ultra-high pressure discharge lamp used as the light source of, for example, a projector. For example, discharge lamp 16 is of a configuration in which a pair of electrodes are arranged opposite each other inside an arc tube composed of quartz glass, a substance such as mercury being enclosed inside the arc tube. The lamp is lit by supplying an alternating current to the pair of electrodes, and an arc is maintained during lighting by a protrusion that is formed on the tip portion of each electrode.

High-frequency generation unit 2 supplies a high-frequency signal. Low-frequency generation unit 3 supplies a first low-frequency signal having a lower frequency than the high-frequency signal. Low-frequency generation unit 4 supplies a second low-frequency signal having a lower frequency than the first low-frequency signal.

Switching unit 5 takes as input the high-frequency signal, the first low-frequency signal, and the second low-frequency signal and selectively supplies one of these inputs. The selection operation of switching unit 5 is carried out in accordance with selection signals from control unit 1. The frequency signal that is supplied from switching unit 5 is supplied to DC/AC inverter 12.

DC/DC converter 11 converts an input direct-current voltage to a direct-current voltage of a designated voltage value. DC/AC inverter 12 takes the direct-current voltage that was supplied from DC/DC converter 11 as input and generates an alternating current having the frequency of the frequency signal supplied from switching unit 5. The alternating current generated by DC/AC inverter 12 is supplied to discharge lamp 16 by way of high-voltage generation unit 13. In other words, lamp drive unit 10 supplies drive power to the discharge lamp. High-voltage generation unit 13 generates a trigger voltage for dielectric breakdown required at the time of the start of lighting.

Voltage detection unit 6 detects the voltage that is equivalent to the lamp voltage that is applied to discharge lamp 16. Current detection unit 7 detects the current that is equivalent to the lamp current that flows to discharge lamp 16. Timer 8, which measures a predetermined time interval, is here configured to measure two hours. Storage unit 9, which stores information, is made up of a storage device such as semiconductor memory.

Console 14 includes, for example, a plurality of buttons and a keyboard, and supplies operation signals as output in accordance with the input operation of the user. The user uses console 14 to designate lamp power modes and to enter various kinds of information relating to the lighting operation of discharge lamp 16. The lamp power modes include, for example, a normal power mode, a standby mode, and a power saving mode. The normal operation mode is a mode of lighting discharge lamp 16 at the rated power. The power saving mode is a mode of lighting discharge lamp 16 with power (low power) that is lower than the normal power mode. A plurality of power-saving modes of different set power can be used as the power saving mode.

Information output unit 15 supplies warning information that indicates the warning signs of a lamp failure according to instructions from control unit 1. Information output unit 15 may be any type of device as long as it is capable of warning the user. For example, a display device such as a liquid crystal display, a speaker, or a light-emitting element such as an LED (Light Emitting Diode) can be used as information output unit 15. In addition, when the discharge lamp lighting device of the present exemplary embodiment is applied in a display device such as a projector, the display function of the display device itself can also be used in place of information output unit 15. In addition, information output unit 15 may also be connected to an information processing device such as a PC (Personal Computer) by way of a network and the error log information (to be described) may then be supplied to the connected PC.

Control unit 1 calculates the lamp power on the basis of the lamp voltage that is detected by voltage detection unit 6 and the lamp current that is detected by current detection unit 7 and adjusts the output voltage of DC/DC converter 11 such that the lamp power reaches the designated power. Here, the designated power is determined in accordance with the lamp power mode that was designated by console 14. More specifically, when the normal power mode has been designated, the designated power is the rated power, and when the power saving mode has been designated, the designated power is a low power (preset value) that is lower than the normal power mode.

In addition, as the steady lighting operation, control unit 1 periodically causes each of the outputs of low-frequency generation units 3 and 4 to be selected in a state in which the output of high-frequency generation unit 2 has been selected as the basic output. For example, control unit 1 causes the output of high-frequency generation unit 2 to be selected, causes the output of low-frequency generation unit 3 or low-frequency generation unit 4 to be selected after a predetermined first output interval, and then causes the output of high-frequency generation unit 2 to be selected after a predetermined second output interval. The first output interval is the interval in which the output of high-frequency generation unit 2 is selected, and the second output interval is the interval in which the output of low-frequency generation unit 3 or low-frequency generation unit 4 is selected, these first and second output intervals being alternately switched. The output of either low-frequency generation units 3 or 4 is selected in the second output interval, but which output of low-frequency generation units 3 and 4 is selected is set in advance and the selection frequency is also set in advance.

The user may use console 14 to designate the frequency that is selected in switching unit 5 from among high-frequency generation unit 2 and low-frequency generation units 3 and 4. In this case, control unit 1 causes the selection of the output that was designated among the outputs of high-frequency generation unit 2 and low-frequency generation units 3 and 4 in switching unit 5 in accordance with operation signals from console 14. At this time, control unit 1 may change the first output interval, the second output interval, and the frequency of selection of the outputs of each of high-frequency generation unit 2 and low-frequency generation units 3 and 4 in accordance with operation signals from console 14.

Control unit 1 may further alter the first output interval and second output interval and the frequency of selection of the outputs of each of the high-frequency generation unit 2 and low-frequency generation units 3 and 4 in accordance with the lamp power mode that is designated in console 14. In this case, the frequency of selection of the outputs of each of low-frequency generation units 3 and 4 in, for example, the power saving mode may be lower than the frequency of selection of the outputs of each of low-frequency generation units 3 and 4 in the normal power mode. The second output interval in the power saving mode may be shorter than the second output interval in the normal power mode.

In addition, control unit 1 determines, on the basis of the voltage detection value that is supplied from voltage detection unit 6, whether the change of the lamp voltage indicates a predetermined voltage characteristic. When the change of the lamp voltage indicates a predetermined voltage characteristic, control unit 1 stores error log information that indicates the operating state of discharge lamp 16 in storage unit 9.

For example, control unit 1 acquires the voltage detection value from voltage detection unit 6 at each of predetermined times and determines on the basis of the voltage detection value and the previously acquired voltage detection value whether the lamp voltage has risen by or in excess of a predetermined value. If the lamp voltage has risen by or in excess of the predetermined value for a predetermined number of successive times, control unit 1 determines that the change of lamp voltage indicates the predetermined voltage characteristic and both stores error log information in storage unit 9 and causes information output unit 15 to supply warning information. The error log information here may include information such as the voltage detection value acquired last, the lamp power mode that is used, and the time interval of lamp usage.

The conditions of the determination of the predetermined voltage characteristic are next described in detail.

Lamp failures include, for example, rupture, cracking, or swelling of the arc tube, which originate in the outer surface of the lamp (the first common lamp failure), and flicker (the second common lamp failure). As a result of repeated experimentation and careful investigation regarding these lamp failures, the inventors of the present invention have found that the change in the lamp voltage indicates specific voltage characteristics of the process of the occurrence of each lamp failure. The inventors of the present invention have created lamp failure warning sign detection parameters for each of the first and second lamp failures.

Figure 2B:
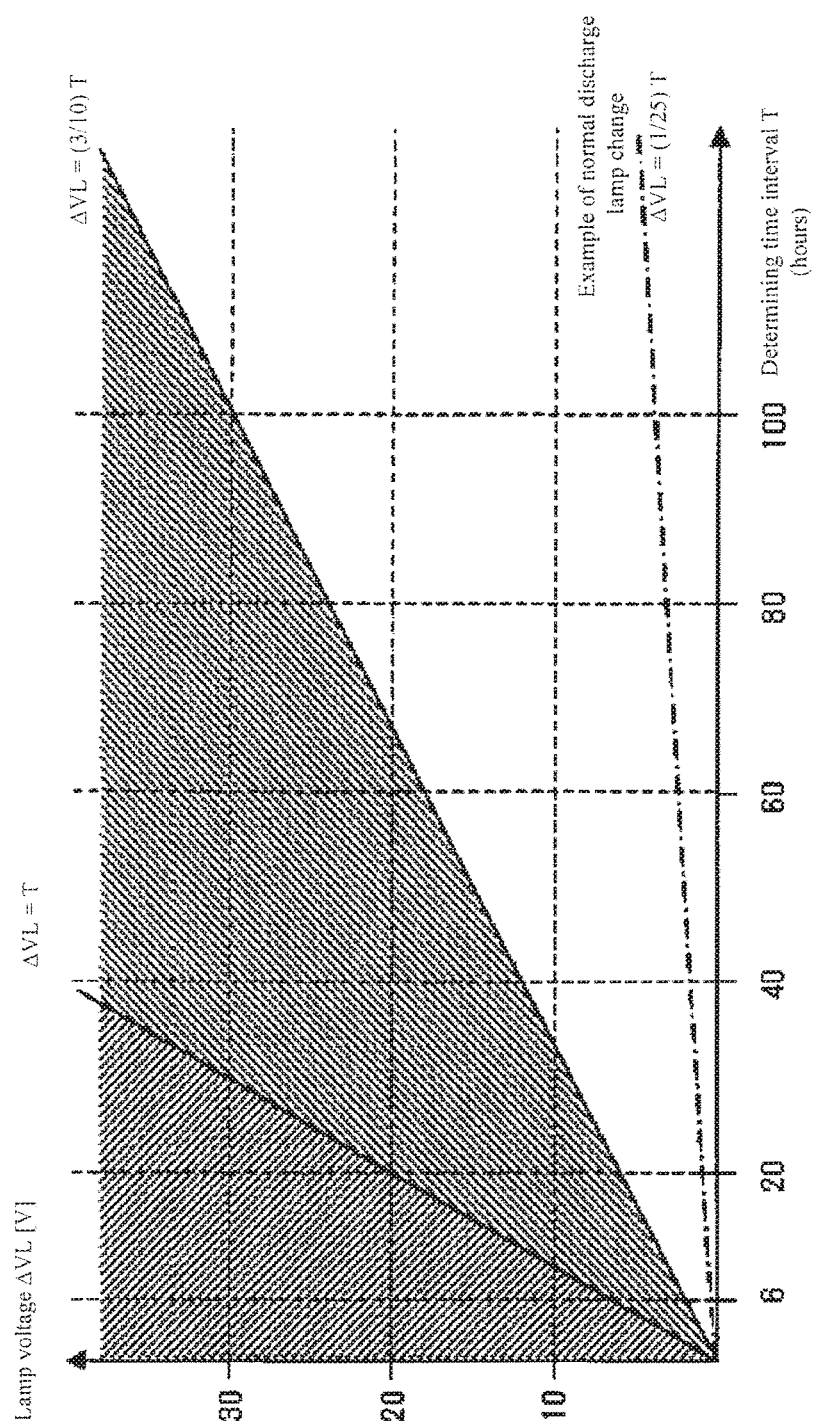
FIG. 2B is a characteristics diagram showing voltage characteristics relating to failure of the discharge lamp.

FIG. 2A shows examples of the lamp failure warning sign detection parameters. In addition, FIG. 2B shows voltage characteristics relating to discharge lamp failures. In FIG. 2B, the characteristic that indicates a change of 30V or more in 100 hours corresponds to the region that is on or above the line given by the formula $\Delta VL=(30/100)T=(3/10)T$. The characteristic that indicates change of 20V or more in 20 hours corresponds to the region on or above the line given by the formula $\Delta VL=(20/20)T=T$. Regarding the line itself of Formula $\Delta VL$, the determination of whether failure occurs according to the discharge lamp characteristic is also set in advance. In the present exemplary embodiment, it is determined that the line itself of Formula $\Delta VL$ represents a voltage characteristic that indicates a warning sign of the occurrence of a discharge lamp failure. An example of a voltage characteristic of a normal discharge lamp is shown by the alternate long and short dash line. The voltage characteristic of this normal discharge lamp indicates a gradual change on the order of 80V in 2000 hours ($\Delta VL=(80/2000)T=(1/25)T$).

When darkening progresses due to abnormality of the halogen cycle, the temperature of the arc tube rises, and as a result, the arc tube swells or the arc tube cracks or ruptures due to the accumulation of thermal strain (the cause of the first lamp failure). In the course of this process, the lamp voltage will indicate a continuous voltage increase of 30V or more in 100 hours. A first lamp failure may also occur within 100 hours while a voltage increase of this inclination is being exhibited. On the basis of this continuous voltage increase, the detection time spacing is set to ten hours and the value of increase of the lamp voltage is set to 3V as the error detection parameters of a first lamp failure. It is then determined every ten hours whether the lamp voltage has increased by 3V or more, and a case in which the lamp voltage increases by 3V or more for four continuous intervals of 10 hours is taken as the determining condition for detecting a voltage characteristic that indicates warning signs of the occurrence of a first lamp failure. In other words, a case in which the amount of change $\Delta VL$ of lamp voltage has increased by 12V (=3×4) or more during the determining time interval T=40 hours, which is the time over which the detection time spacing of ten hours has continued for four successive intervals, i.e., [Formula 1] $\Delta VL \geq (3/10)T$ is satisfied, is taken as the determining condition for detecting the voltage characteristic that indicates the occurrence of the first lamp failure or a warning sign thereof.

On the other hand, when the temperature of electrode tips decreases, a portion of the protrusions of the electrode tips is lost, thereby causing movement of the bright spot and giving rise to flicker (the cause of the second lamp failure).

In the course of this series of processes, the lamp voltage exhibits a precipitous rise in voltage of 20V or more in 20 hours. The second lamp failure in some cases occurs within 20 hours while exhibiting a voltage rise of this inclination. On the basis of this precipitous voltage rise, the detection time spacing is set to two hours and the value of the increase of lamp voltage is set to 2V as the error detection parameters of the second lamp failure. It is then determined every two hours whether the lamp voltage has increased by 2V or more, and a case of determining that the lamp voltage has increased by 2V or more for three successive detection intervals is taken as the determining condition for detecting a voltage characteristic that indicates the warning sign of the occurrence of the second lamp failure. In other words, a case in which the amount of change $\Delta VL$ of the lamp voltage has increased by 6V ($=2\times3$) or more during a determining time T ($=6$ hours), which is the time during which the detection time spacing of two hours has continued for three successive intervals, i.e., a case in which Formula 2 ($\Delta VL \geq T$, is taken as the determining condition for detecting a voltage characteristic that indicates the occurrence or a warning sign of the occurrence of the second lamp failure.

The operation of the lamp lighting device of the present exemplary embodiment will next be described in detail.

Control unit 1 uses the determining conditions that are based on the voltage characteristics, that indicate the above-described first and second lamp failure occurrence warning signs, to execute a lamp abnormality detection process.

Figure 3:
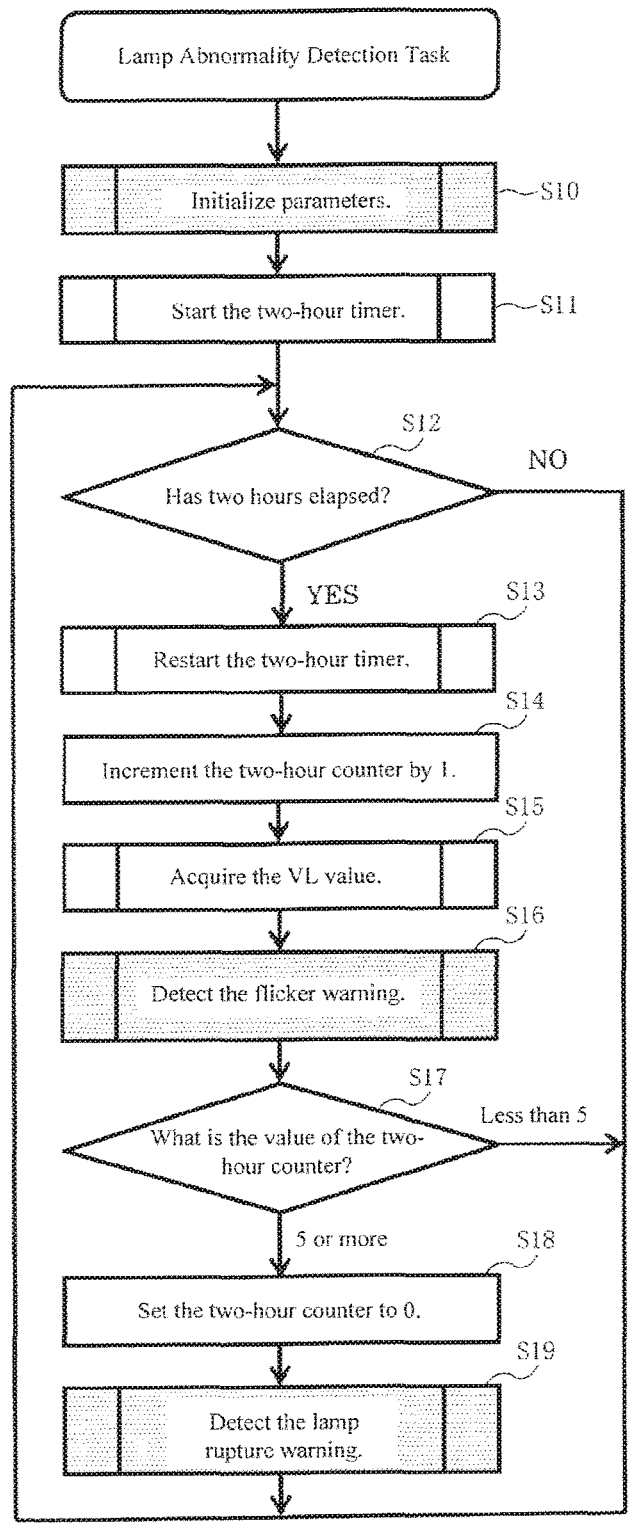
FIG. 3 is a flow chart showing the procedure of the lamp abnormality detection process.

FIG. 3 is a flow chart showing the procedures of the lamp abnormality detection process. In this case, timer 8 includes a two-hour timer that measures two-hour intervals and a lamp usage timer that measures the hours of use of the lamp. Storage unit 9 stores information necessary for lighting the discharge lamp (such as the lamp power and control information for switching the frequency of the alternating-current) for each lamp power mode. Storage unit 9 further includes EEPROM (Electrically Erasable Programmable Read-Only Memory) that saves the results of the lamp abnormality detection process (processing data). Control unit 1 is provided with a work memory, and stores in the work memory necessary information from storage unit 9 at the time of starting the lamp abnormality detection process. The items: VL2H_OLD, VL10H_OLD, two-hour counter, flicker warning number counter, and rupture warning number counter have been prepared as the work data in the work memory. VL2H_OLD indicates the VL value of two hours earlier, and VL10H_OLD indicates the VL value of ten hours earlier. The VL value indicates the detected value of the lamp voltage.

Control unit 1 first initializes the parameters of the work memory (Step S10). Control unit 1 next starts the two-hour timer (Step S11) and determines whether two hours has elapsed (Step S12).

Next, when two hours has elapsed, control unit 1 restarts the two-hour timer (Step S13), adds "1" to the count value of the two-hour counter (Step S14), and acquires the detected value (VL value) of the lamp voltage from voltage detection unit 6 (Step S15).

After acquiring the VL value, control unit 1 executes a flicker warning detection process (Step S16). Control unit 1 next determines whether the counter value of the two-hour counter has reached 5 (Step S17). If the counter value has not reached 5, control unit 1 returns to the process of Step S12.

If the counter value of the two-hour counter has reached 5, control unit 1 resets the counter value of the two-hour counter (Step S18) and executes a lamp rupture warning detection process (Step S19). Control unit 1 then returns to the process of Step S12.

Figure 4:
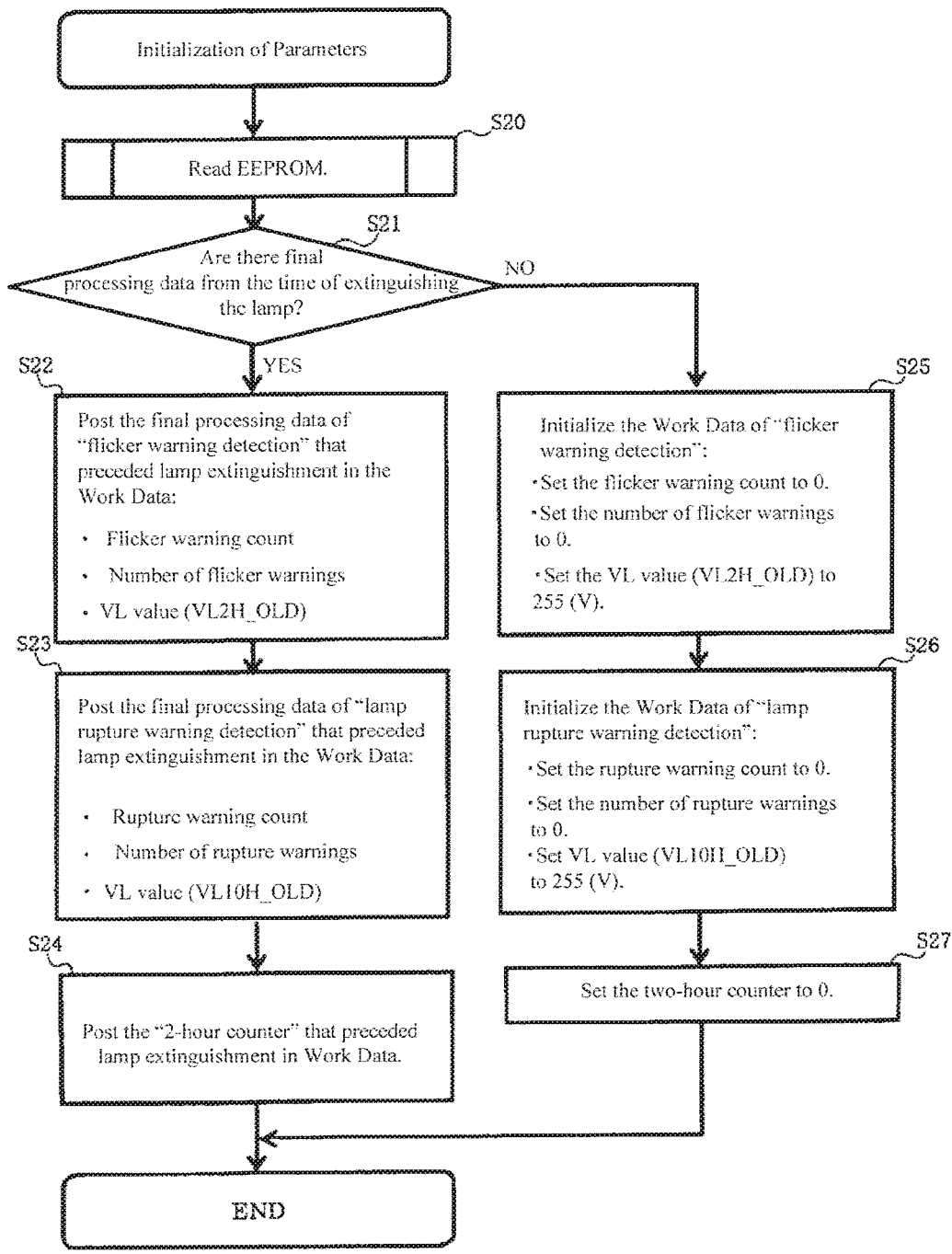
FIG. 4 is a flow chart showing the procedure of the parameter initialization process shown in FIG. 3.

FIG. 4 is a flow chart showing the procedure of the parameter initialization process of Step S10 shown in FIG. 3.

Control unit 1 accesses EEPROM (Step S20) and checks whether there are final processing data of the time of extinguishing the lamp (Step S21).

If there are final processing data, control unit 1 posts to the work data the final processing data (the count value of flicker warnings, the number of flicker warnings, the VL value (VL2H_OLD)) of the "flicker warning detection" that preceded extinguishing the lamp (Step S22). Control unit 1 next posts to the work data the final processing data (rupture warning count value, number of lamp rupture warnings, the VL value (VL10H_OLD)) of the "lamp rupture warning detection" that preceded extinguishing the lamp (Step S23). Finally, control unit 1 posts to the work data the count value of the two-hour counter that preceded extinguishing the lamp (Step S24).

On the other hand, when there are no final processing data, control unit 1 initializes the work data of the "flicker warning detection" (Step S25). More specifically, control unit 1 resets both the flicker warning count value and the number of flicker warnings to 0 and sets the VL value (VL2H_OLD) to 255V. Control unit 1 next initializes the work data of the "lamp rupture warning detection" (Step S26). More specifically, control unit 1 resets both the rupture warning count value and the number of lamp rupture warnings to 0 and sets VL value (VL10H_OLD) to 255V. Finally, control unit 1 resets the count value of the two-hour counter to 0 (Step S27).

Figure 5:
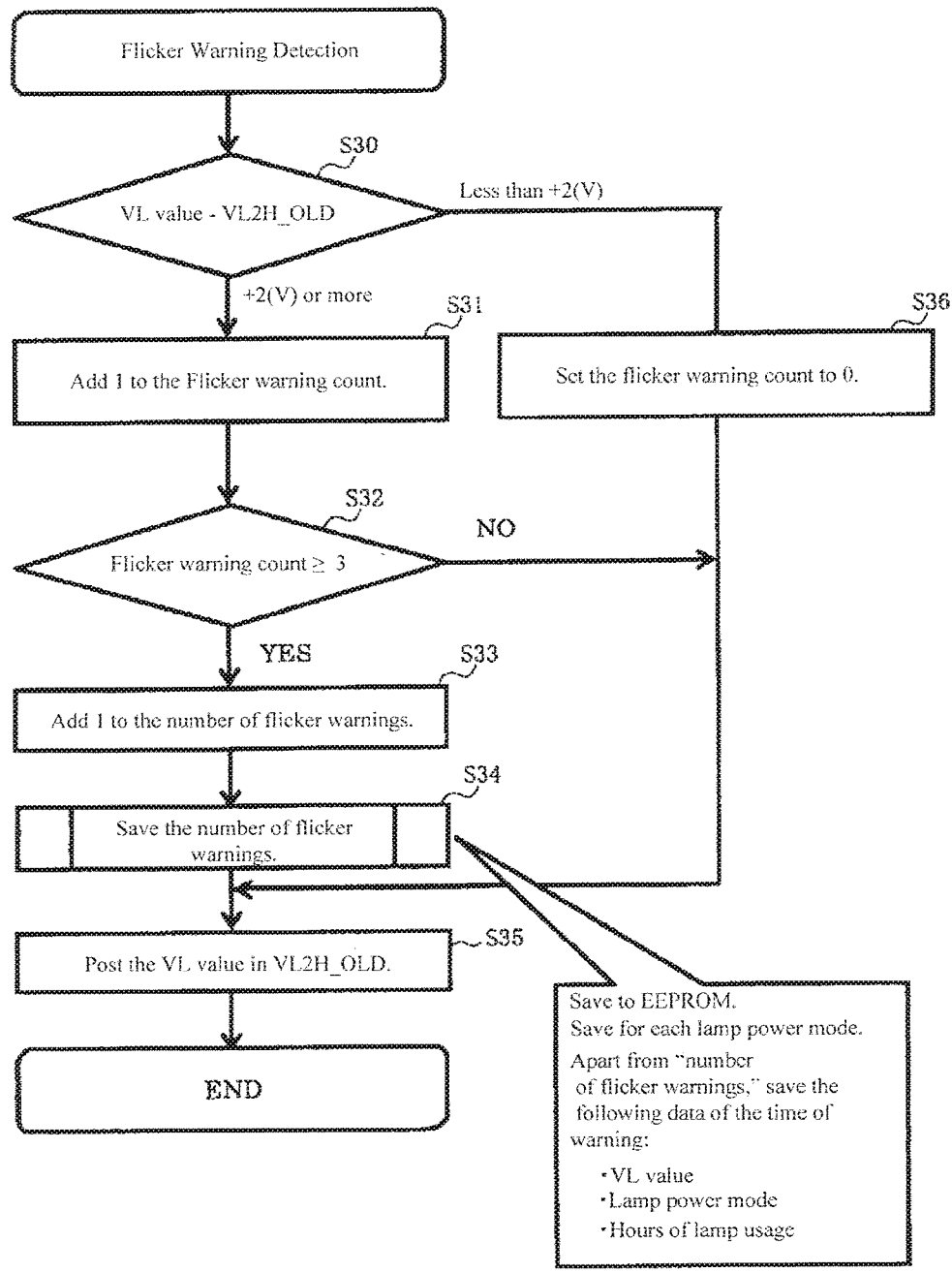
FIG. 5 is a flow chart showing the procedure of the flicker warning detection process.

FIG. 5 is a flow chart showing the procedure of the flicker warning detection process.

Control unit 1 determines whether the value obtained by subtracting the value of VL2H_OLD from the VL value acquired in Step S15 of FIG. 3 is equal to or greater than 2V (Step S30).

If the value is 2V or greater, control unit 1 adds 1 to the count value of the flicker warning counter (Step S31). Control unit 1 next determines whether the count value of the flicker warning counter is equal to or greater than 3 (Step S32).

If the count value is equal to or greater than 3, control unit 1 adds 1 to the number of flicker warnings (Step S33) and saves the number of flicker warnings in EEPROM (Step S34). The number of flicker warnings is here saved for each lamp power mode. In addition, as data other than the number of flicker warnings, data of the time of warning may be saved together in EEPROM regarding, for example, the VL value, the lamp power mode, and the hours of use of the lamp. The number of flicker warnings is information corresponding to flicker, and is information indicating warning of the occurrence of flicker.

Finally, control unit 1 posts the VL value in VL2H_OLD (Step S35).

When the determination result of Step S30 falls below 2V, control unit 1 resets the count value of the flicker warning counter to 0 (Step S36), following which the process of Step S35 is executed.

Figure 6:
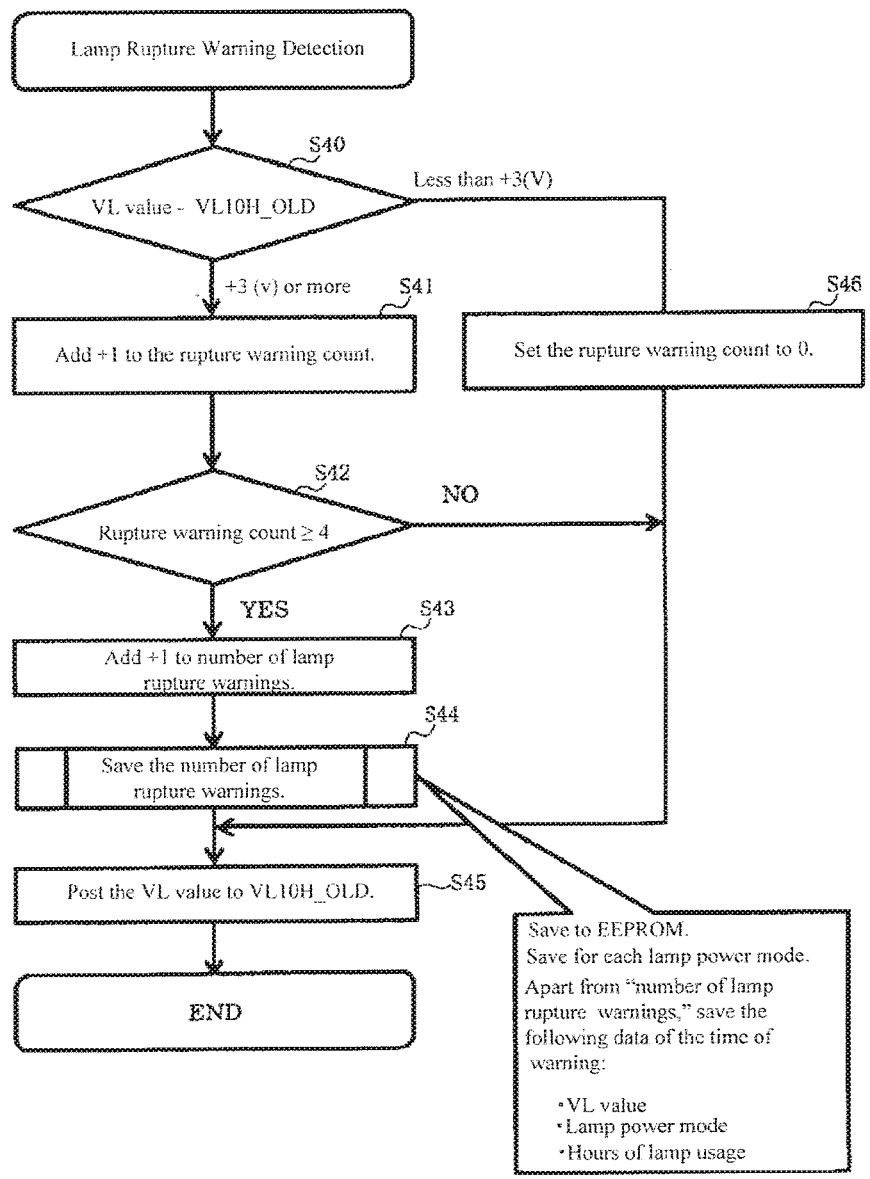
FIG. 6 is a flow chart showing the procedure of the lamp rupture warning detection process shown in FIG. 3.

FIG. 6 is a flow chart showing the procedure of the lamp rupture warning detection process of Step S19 of FIG. 3.

Control unit 1 determines whether the value obtained by subtracting VL10H_OLD from the VL value acquired in Step S15 is equal to or greater than 3V (Step S40).

If the value is equal to or greater than 3V, control unit 1 adds 1 to the count value of the rupture warning counter (Step S41). Control unit 1 next determines whether the count value of the rupture warning counter is equal to or greater than 4 (Step S42).

When the count value is equal to or greater than 4, control unit 1 adds 1 to the number of lamp rupture warnings (Step S43) and saves the number of lamp rupture warnings in EEPROM (Step S44). The number of lamp rupture warnings is here saved for each lamp power mode. In addition, as data other than the number of lamp rupture warnings, data of the time of warning regarding the VL value, lamp power mode, and the hours of lamp use may also be saved together in EEPROM. The number of lamp rupture warnings is information that corresponds to cracking or rupture and is information indicating warning of cracking or rupture.

Finally, control unit 1 posts the VL value in VL10H_OLD (Step S45).

When the result of the determination of Step S40 is less than 3V, control unit 1 resets the count value of the lamp rupture warning counter to 0 (Step S46). The process of Step S45 is then executed.

In addition to the above-described lamp abnormality detection process (FIGS. 3-6), control unit 1 executes a lamp control process.

Figure 7:
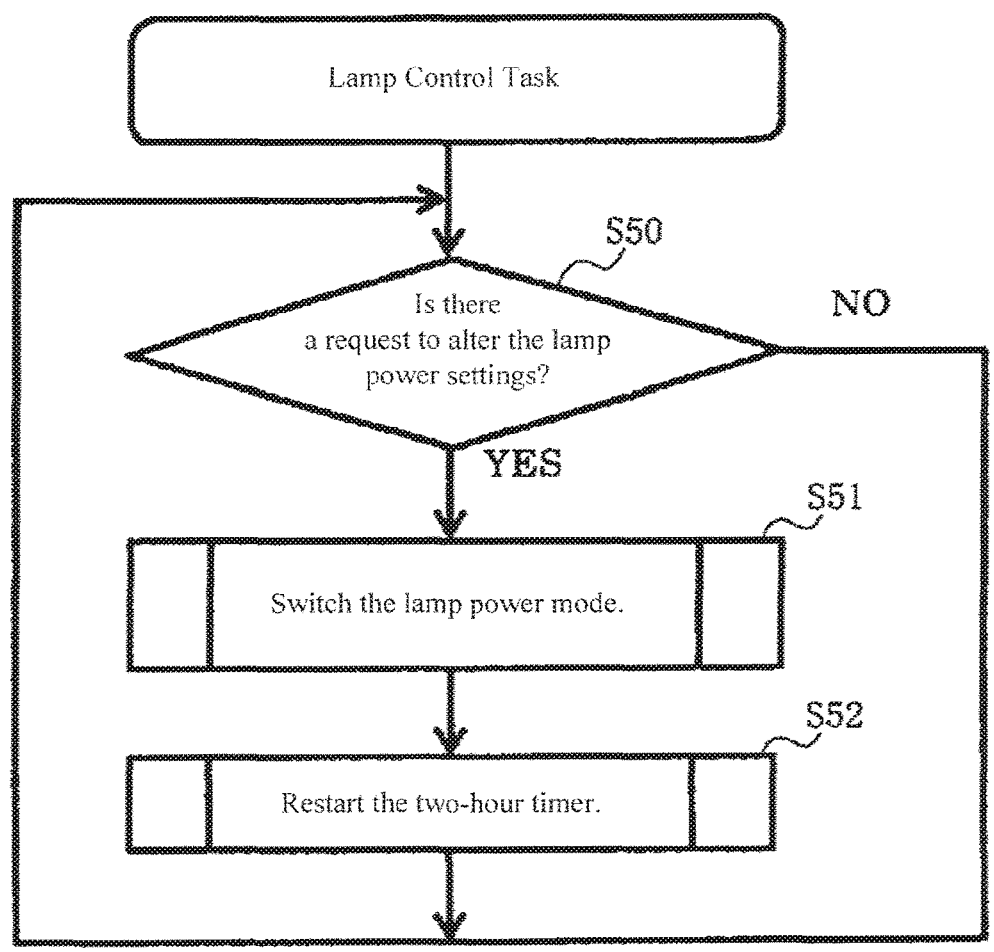
FIG. 7 is a flow chart showing the procedure of the lamp control process.

FIG. 7 is a flow chart showing the procedure of the lamp control process.

Control unit 1 determines whether there has been a request to alter the lamp power settings (Step S50). The request to alter lamp power settings here indicates a request from console 14 to switch the lamp power mode.

If there has been a request to alter the lamp power setting, control unit 1 carries out switching to the lamp power mode that was designated in console 14 (Step S51). Finally, control unit 1 restarts the two-hour timer (Step S52).

The task activation process for executing the above-described lamp abnormality detection process and lamp control process is next described.

Figure 8:
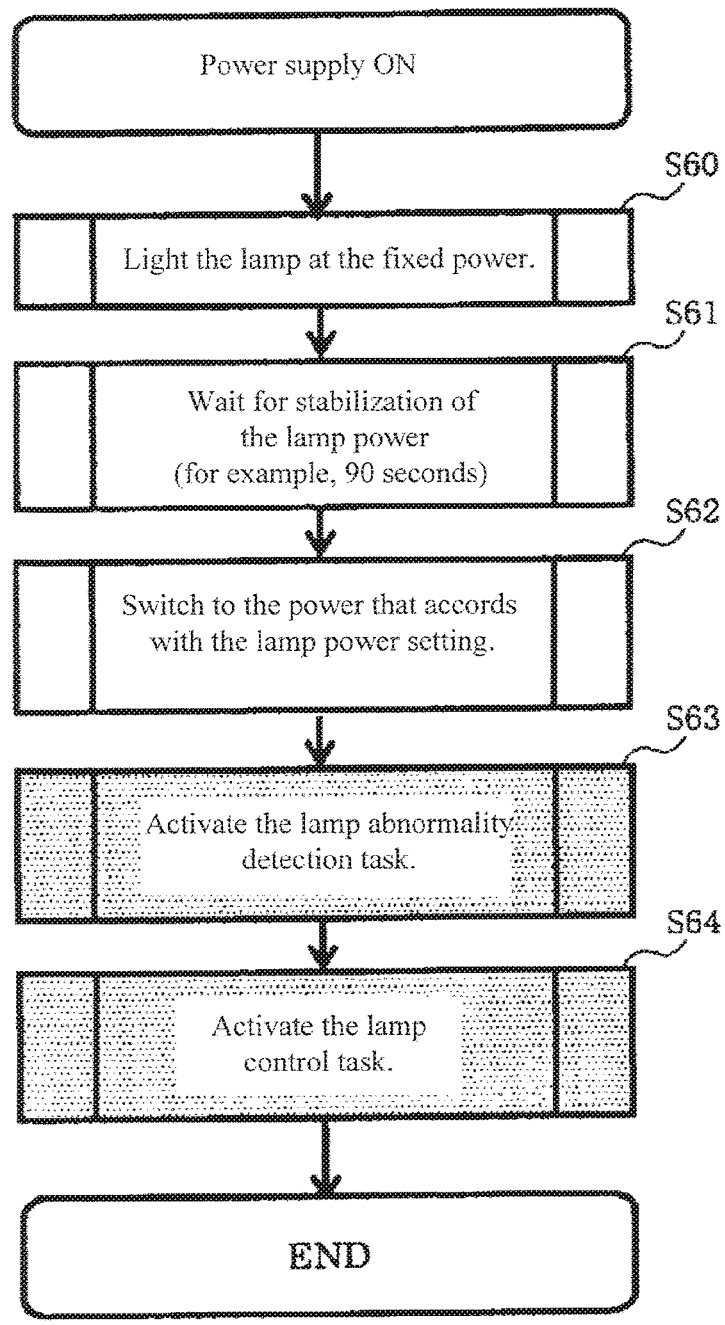
FIG. 8 is a flow chart showing the procedure of the task activation process.

FIG. 8 is a flow chart showing the procedure of the task activation process.

Control unit 1 causes lighting of the lamp at a fixed power that has been set in advance (Step S60). More specifically, the control unit adjusts the output voltage of DC/DC converter 11 such that the lamp power that was calculated based on the lamp voltage from voltage detection unit 6 and based on the lamp current from current detection unit 7 reaches a fixed power.

After lighting, control unit 1 waits until the lamp power stabilizes (Step S61). For example, when the time for the lamp power to stabilize is assumed to be 90 seconds, control unit 1 maintains this operating state for 90 seconds after lighting the lamp in Step S60.

When the lamp power is stable, control unit 1 switches to the power that accords with the lamp power settings (Step S62). This switching corresponds to the processes of Steps S50-S52 of FIG. 7.

After switching the lamp power settings, control unit 1 activates the lamp abnormality detection task (Step S63) and activates the lamp detection task (Step S64).

The data saving process at the time of turning OFF the power supply is next described.

Figure 9:
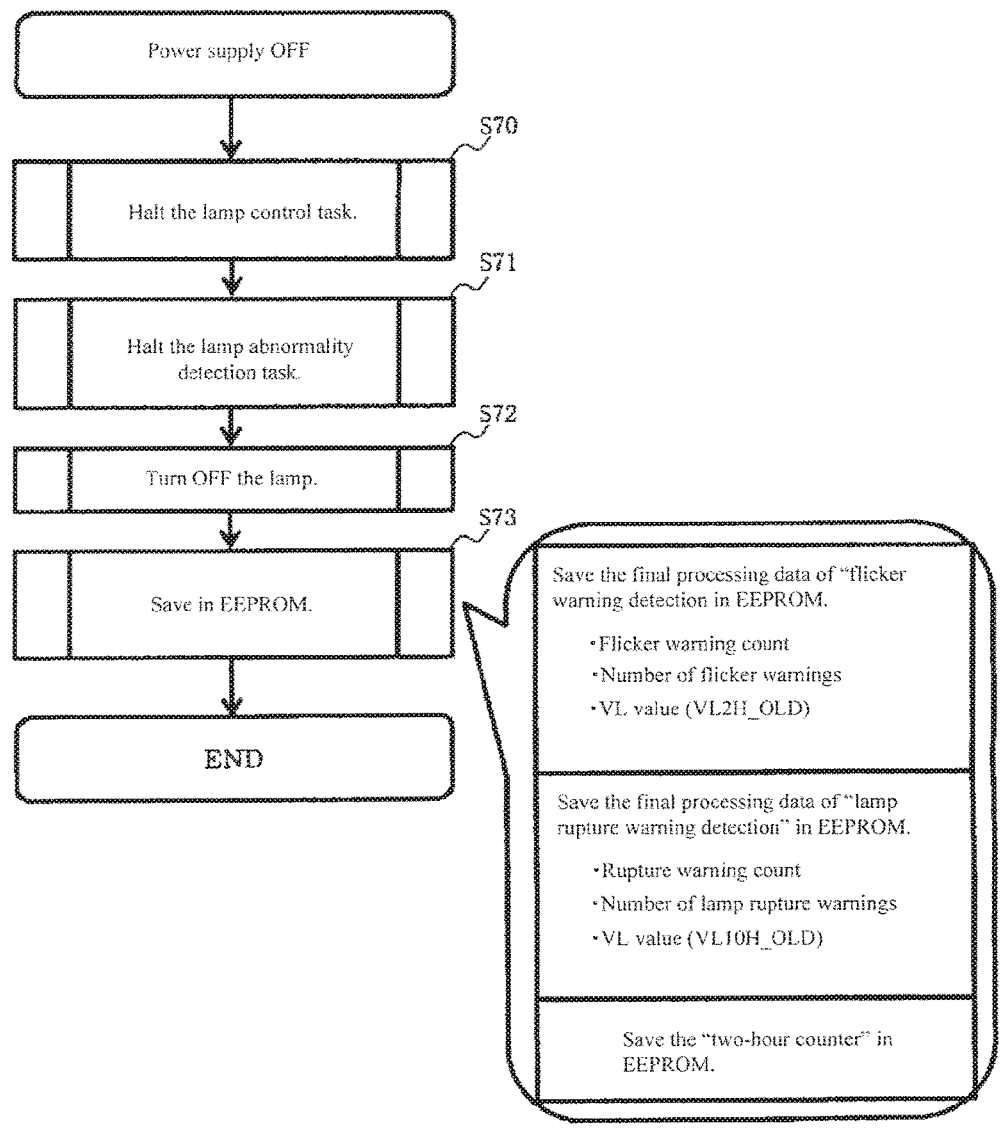
FIG. 9 is a flow chart showing the procedure of the data saving process when power is turned OFF.

FIG. 9 is a flow chart showing the procedure of the data saving process at the time of turning OFF the power supply.

In accordance with an operation signal from console 14 indicating that the power supply is to be turned OFF, control unit 1 halts the lamp control task (Step S70) and halts the lamp abnormality detection task (Step S71). After halting the tasks, control unit 1 extinguishes discharge lamp 16 (Step S72).

Finally, control unit 1 saves the final processing data of the "flicker warning detection," the final processing data of the "lamp rupture warning detection," and the two-hour counter value in EEPROM (Step S73). The final processing data of the "flicker warning detection" includes the flicker warning count value, the number of flicker warnings, and the lamp voltage (VL2H_OLD). The final processing data of the "lamp rupture warning detection" includes the rupture warning count value, the number of lamp rupture warnings, and the lamp voltage (VL10H_OLD). Here, the lamp voltage (VL2H_OLD) and the lamp voltage (VL10H_OLD) are the lamp voltage values that were acquired last.

Figure 10:
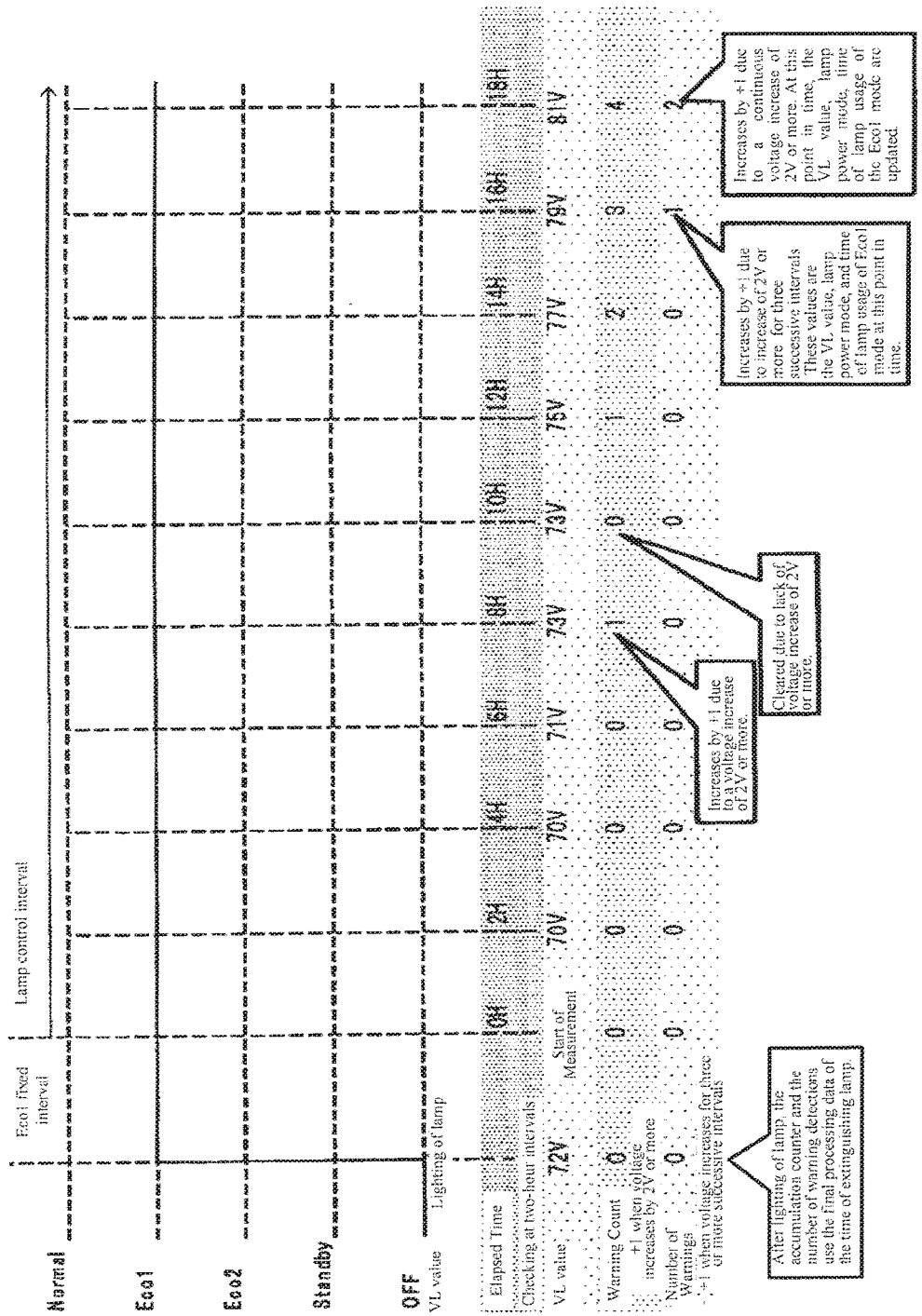
FIG. 10 is a view for describing an example of the flicker detection operation.

As an example, the flicker detection operation is shown in FIG. 10. In FIG. 10, "Normal" indicates the normal power mode, "Eco1" indicates the first power saving mode, "Eco2" indicates the second power saving mode, and "Standby" indicates the standby mode. The power of the first power saving mode is lower than the power of the normal power mode. The power of the second power saving mode is lower than the power of the first power saving mode. The power of the standby mode is lower than the power of the second power saving mode.

In the example shown in FIG. 10, the discharge lamp is lighted in the first power saving mode, and the lamp voltage (VL value), the warning count, and the number of warnings are shown every two hours. At the time of starting lighting, the VL value, the warning count, and the number of warnings are "72V," "0," and "0," respectively. The warning count and the number of warnings are both "0" at the time of starting measurement.

The lamp voltage rises 2V or more for each of the elapsed times of "12H," "14H," "16H," and "18H." The warning counter becomes "1" at the elapsed time "12H," becomes "2" at the elapsed time "14H," becomes "3" at the elapsed time "16H," and becomes "4" at the elapsed time "18H." The number of warnings is "0" at elapsed times "12H" and "14H" but becomes "1" at elapsed time "16H" and becomes "2" at elapsed time "18H." In this case, it is determined that a voltage increase of 2V or more has occurred three successive times when the elapsed time is "16H," and data (first power saving mode, lamp voltage "79V," usage time "16H") indicating the operating state of the lamp at this time are stored in storage unit 9. It is further determined that a voltage increase of 2V or more has occurred three times successively when the elapsed time is "18H," and the information stored in storage unit 9 is updated on the basis of data (first power saving mode, lamp voltage "81V," usage time "18H") indicating the operating state of the lamp at this time.

Figure 11:
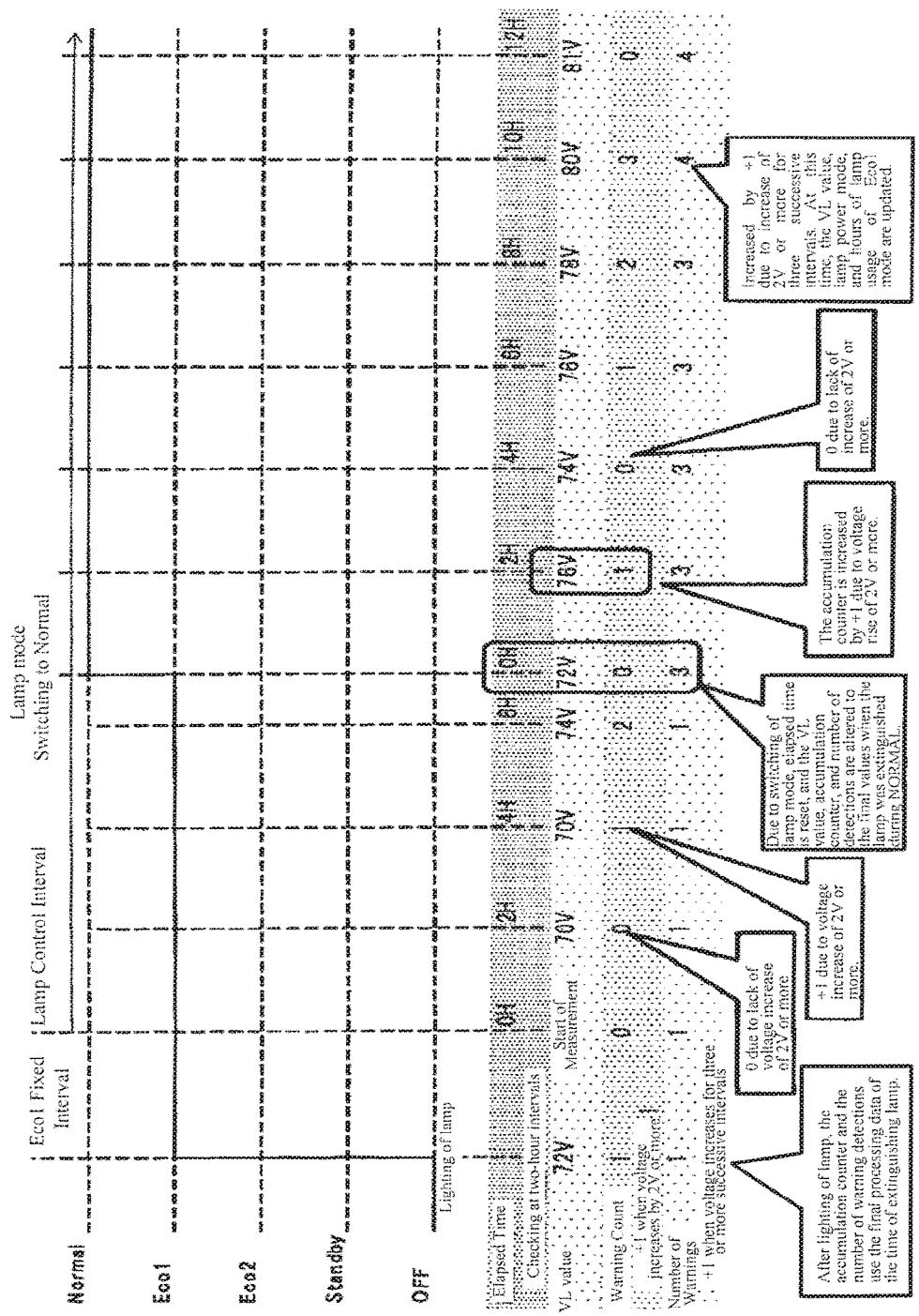
FIG. 11 is a view for describing another example of the flicker detection operation.

FIG. 11 shows another example of the flicker detection operation. In the example shown in FIG. 11, the discharge lamp is lighted in the first power saving mode and subsequently switched to the normal power mode. Switching to the normal power mode is carried out after the elapsed time of "6H" is passed. In addition, at the start of lighting, the VL value is "72V," the warning count is "1," and the number of warnings is "1." At the start of measurement, the warning count is "0" and the number of warnings is "1."

The lamp voltage rises by 2V or more both when the elapsed time is "4H" and the elapsed time is "6H." The warning count becomes "1" when the elapsed time is "4H" and becomes "2" when the elapsed time is "6H." When switching to the normal power mode is carried out, the warning count is reset to "0" and the elapsed time is also reset to "0." At this time, the number of warnings is the last value "3" that was saved when the lamp was extinguished in the previous normal power mode.

After resetting, the lamp voltage rises by 2V or more for each of the times at which the elapsed time is "6H," "8H," and "10H." The warning count becomes "1" when the elapsed time is "6H," becomes "2" when the elapsed time is "8H," and becomes "3" when the elapsed time is "10H." The number of warnings is "3" when the elapsed time is "6H" and "8H" but becomes "4" when the elapsed time is "10H." In this case, the voltage is determined to have increased by 2V or more for three successive intervals when the elapsed time is "10H," and the information stored in storage unit 9 is updated on the basis of the data (first power saving mode, lamp voltage "80V," and time of usage "10H") that indicate the operating state of the lamp at this time.

According to the discharge lamp lighting device of the present exemplary embodiment described hereinabove, warning signs of the occurrence of lamp failure such as lamp rupture or flicker have been detected, and error log information that indicates the operating state of the lamp is stored in storage unit 9. As a result, when a lamp failure occurs, the cause of the lamp failure can be identified on the basis of the error log information that was stored in storage unit 9.

If data (such as the lamp voltage) that indicate the operating state of the discharge lamp are acquired at fixed time intervals and the acquired data then held as time series information, the cause of a discharge lamp failure can be identified by referring to this saved time series information. In this case, however, the time series information becomes voluminous, and therefore requires a large-capacity memory and a consequent increase in costs.

On the other hand, according to the discharge lamp lighting device of the present exemplary embodiment, when warning signs of the occurrence of lamp failure have been detected, the data that indicate the operating state of the lamp are acquired and stored in storage unit 9 as error log information, whereby the storage capacity can be greatly reduced compared to a case in which data indicating the operating state of the lamp are acquired at fixed time intervals and held as time series information.

Still further, because information output unit 15 supplies warning information when warning signs of the occurrence of a lamp failure are detected, the user's attention can be alerted to the occurrence of a lamp failure.

Finally, because the particulars of the cause of a lamp failure can be identified, a trend analysis of the failure and failure countermeasures can be quickly carried out.

Second Exemplary Embodiment

The discharge lamp lighting device of the present exemplary embodiment includes the configuration shown in FIG. 1, similar to the first exemplary embodiment, but differs from the first exemplary embodiment in that a recovery process is carried out when warning signs of the occurrence of a lamp failure are detected. The operations other than the recovery process are as described in the first exemplary embodiment and explanation is therefore here omitted.

At the time of the steady lighting operation, control unit 1 causes each of the outputs of low-frequency generation units 3 and 4 to be periodically selected in a state in which the output of high-frequency generation unit 2 is selected in switching unit 5, and when the change in the lamp voltage is determined to indicate a predetermined voltage characteristic, causes the output of low-frequency generation unit 4 to be selected over a predetermined interval.

Figure 12:
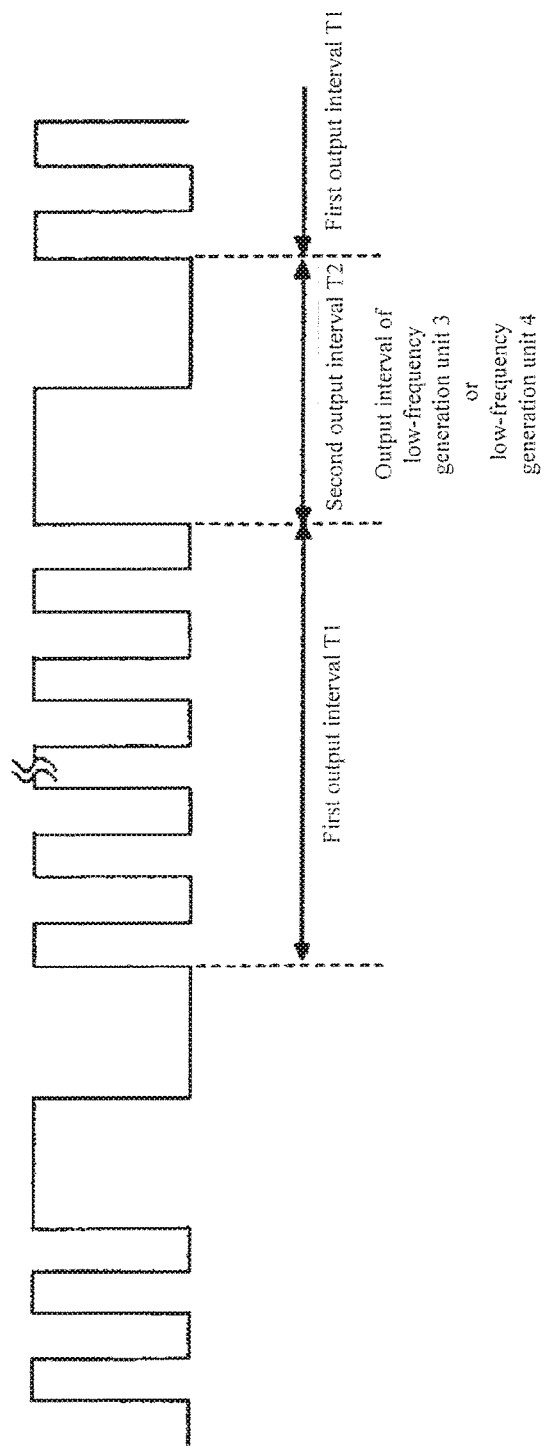
FIG. 12 is a waveform diagram that shows an example of the output waveform of the switching unit at the time of a steady lighting operation in the discharge lamp lighting device according to the second exemplary embodiment of the present invention.
Figure 13:
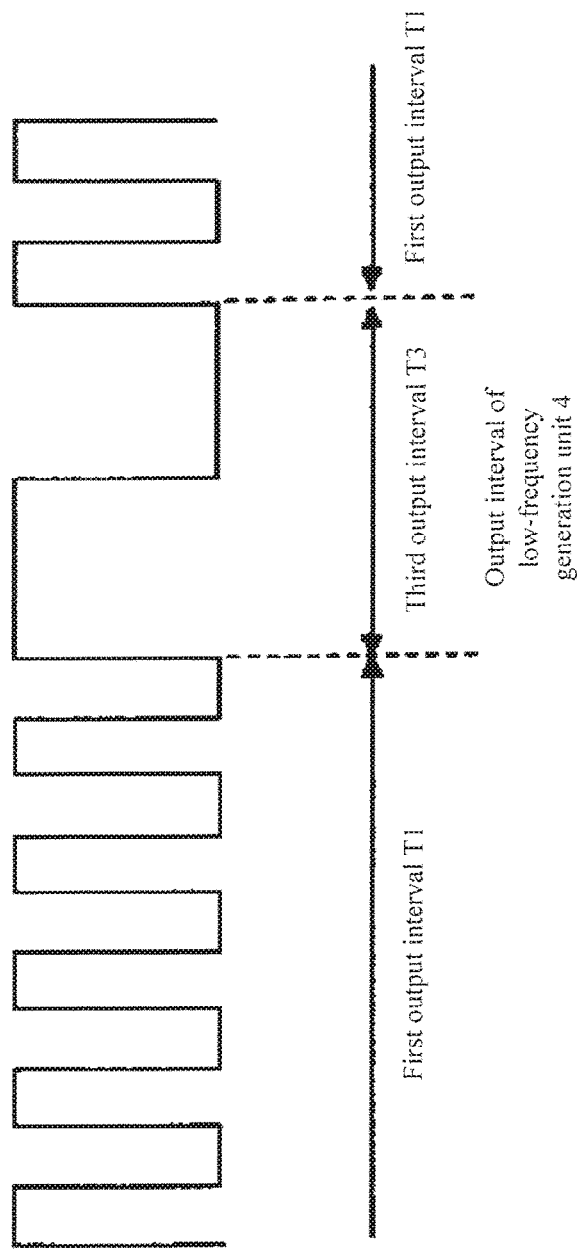
FIG. 13 is a waveform diagram showing an example of the output waveform of the switching unit at the time of a recovery operation in the discharge lamp lighting device according to the second exemplary embodiment of the present invention.

FIG. 12 shows an example of the output waveform of switching unit 5 at the time of the steady lighting operation. FIG. 13 shows an example of the output waveform of switching unit 5 at the time of a recovery operation.

As the steady lighting operation, control unit 1 causes each of the outputs of low-frequency generation units 3 and 4 to be periodically selected in a state in which the output of high-frequency generation unit 2 is selected as the basic output. More specifically, as shown in FIG. 12, control unit 1 causes the selection of the output of high-frequency generation unit 2, causes selection of the output of low-frequency generation unit 3 or low-frequency generation unit 4 after a predetermined first output interval T1, and causes selection of the output of high-frequency generation unit 2 after a predetermined second output interval T2. First output interval T1 is the interval of selecting the output of high-frequency generation unit 2, and second output interval T2 is the interval of selecting the output of low-frequency generation unit 3 or low-frequency generation unit 4. First output interval T1 and second output interval T2 are alternately switched. The output of low-frequency generation units 3 or 4 is selected in second output interval T2, but which output of low-frequency generation units 3 and 4 is selected is set in advance, and the frequency of selection of the outputs is also set in advance.

When it has been determined that the change in the lamp voltage indicates a predetermined voltage characteristic, for example, upon detection of the warning signs of the occurrence of a lamp failure such as the flicker or lamp rupture described in the first exemplary embodiment, control unit 1 causes the output of low-frequency generation unit 4 to be selected over a third output interval T3 as shown in FIG. 13. Third output interval T3 is, for example, an interval of one cycle.

By supplying an alternating current of lower frequency to discharge lamp 16 in third output interval T3, surplus tungsten that has adhered to the vicinity of the protrusions melts, and the melted tungsten is supplied to the portion of the protrusions by, for example, surface tension. As a result, uniform electrode spacing can be maintained, and the shape of the protrusions can be stably maintained.

According to the discharge lamp lighting device of the present exemplary embodiment, in addition to the effects described in the first exemplary embodiment, the effect of enabling a longer lifetime of the discharge lamp can be achieved by means of the recovery process.

Third Exemplary Embodiment

Figure 14:
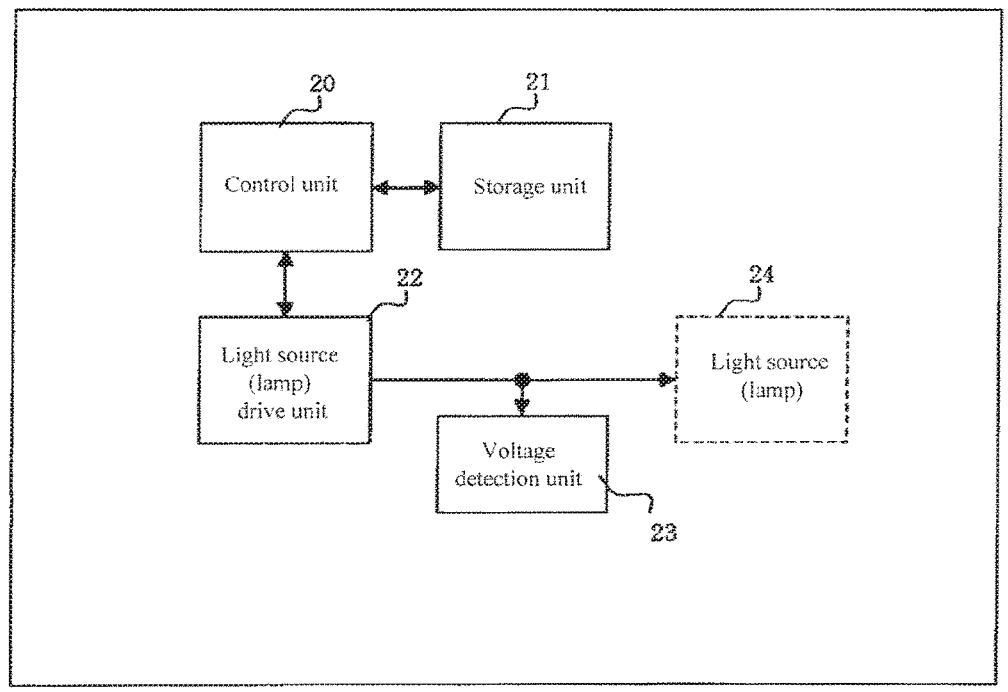
FIG. 14 is a block diagram showing the configuration of the discharge lamp lighting device according to the third exemplary embodiment of the present invention.
Figure 15:
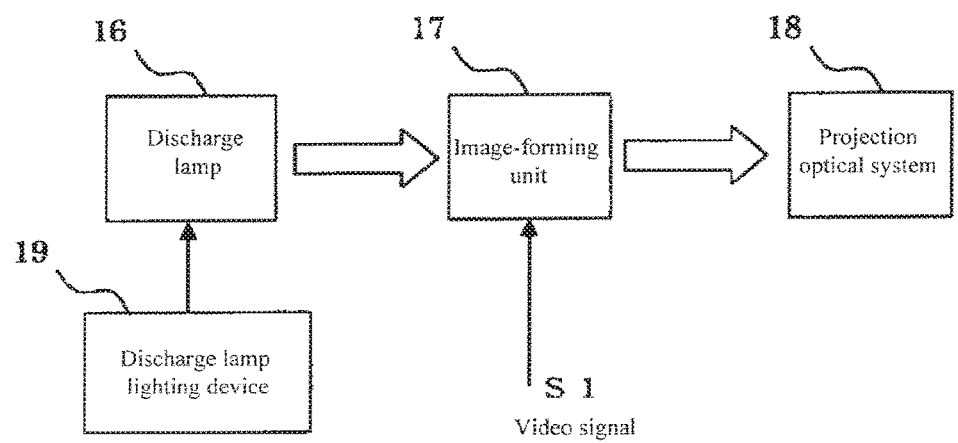
FIG. 15 is a block diagram showing an example of a projector that is equipped with the discharge lamp lighting device of the present invention.

FIG. 14 is a block diagram showing the configuration of the discharge lamp lighting device that is the third exemplary embodiment of the present invention.

Referring to FIG. 14, the discharge lamp lighting device is a device that controls lighting of light source 24 and includes control unit 20, storage unit 21, light source drive unit 22, and voltage detection unit 23. Light source 24 is, for example, discharge lamp 16 that was described in the first exemplary embodiment.

Storage unit 21 stores information. Light source drive unit 22 supplies drive power to light source 24. Voltage detection unit 23 detects the lamp voltage of light source 24. When, on the basis of the voltage detection value that is supplied from voltage detection unit 23, the lamp voltage change of light source 24 indicates a predetermined voltage characteristic, control unit 20 stores in storage unit 21 error log information that indicates the operating state of light source 24.

The effects described in the first exemplary embodiment can also be obtained in the discharge lamp lighting device of the present exemplary embodiment. Voltage detection unit 23 may also be provided in light source drive unit 22.

The discharge lamp lighting devices of the first to third exemplary embodiments described hereinabove are only examples of the present invention, and the configuration and operation of the device are open to modification as appropriate.

In the first and second exemplary embodiments, the error detection parameters can be altered as appropriate. For example, for discharge lamps of differing configuration and rated power, error detection parameters may be created for each type of discharge lamp.

In addition, although the lamp voltage was detected using a two-hour timer, the present invention is not limited to this form. As long as the lamp voltage can be detected at the time interval of the error detection parameters, a timer other than a two-hour timer, for example, a one-hour timer or a thirty-minute timer, may also be used. However, a timer is preferably used that measures a time interval that is the least common multiple of the time interval of the error detection parameters of each lamp failure. When a one-hour timer or thirty-minute timer is used, the average value of the lamp voltage every two hours and the average value of the lamp voltage every ten hours are each used as the VL values.

Further, when a refresh operation is carried out upon the detection of the lamp voltage (VL value), the detection of lamp voltage (VL value detection) is resumed after the passage of a predetermined time interval after the time of this refresh operation.

In the configuration shown in FIG. 1, voltage detection unit 6 and current detection unit 7 may be provided inside lamp drive unit 10. In this case, voltage detection unit 6 and current detection unit 7 may also detect the output voltage and output current of DC/DC converter 11. In addition, high-frequency generation unit 2, low-frequency generation units 3 and 4, and switching unit 5 may be provided inside lamp drive unit 10.

The discharge lamp lighting device of the present invention can be applied to a display device such as a projector.

FIG. 14 shows an example of a projector. This projector includes: discharge lamp 16, discharge lamp lighting device 19 that lights discharge lamp 16, image forming unit 17 that spatially modulates luminous flux from discharge lamp 16 on the basis of input video signal Si to form an image, and projection optical system 18 that projects the image formed by image forming unit 17.

Discharge lamp lighting device 19 is the discharge lamp lighting device that was described in the first or second exemplary embodiment. Image forming unit 17 is, for example, a liquid crystal display device or digital micromirror element (DMD). Further, FIG. 14 shows only the principal configuration and omits video processing circuits and optical elements such as mirrors and lenses.

The projector may also be configured to form an image corresponding to error log information in image forming unit 17.

The present invention can adopt forms such as shown in the following Supplementary Notes 1-19 but is not limited to these forms.

(Supplementary Note 1)

A discharge lamp lighting device that controls lighting of a discharge lamp includes:
a storage unit that stores information;
a lamp drive unit that supplies drive power to the discharge lamp;
a voltage detection unit that detects the lamp voltage of the discharge lamp; and
a control unit that, on the basis of the voltage detection value that is supplied from the voltage detection unit, stores in the storage unit error log information that indicates the operating state of the discharge lamp when change of the lamp voltage indicates a predetermined voltage characteristic.

(Supplementary Note 2)

In the discharge lamp lighting device as described in Supplementary Note 1, the control unit acquires the voltage detection value for each detection time interval, compares the voltage detection value with the previously acquired voltage detection value, and stores the error log information in the storage unit when the lamp voltage has increased by a predetermined value or more for a predetermined number of successive time intervals.

(Supplementary Note 3)

In the discharge lamp lighting device as described in Supplementary Note 2, the voltage characteristic is a characteristic that satisfies:

$$\Delta VL \geq (3/10)T \qquad \text{Formula 1:}$$

where the time interval in which the detection time interval has continued the predetermined number of successive time intervals is assumed to be determining time interval T (in units of hours), and the amount of change of the lamp voltage that has changed during the determining time interval T is assumed to be $\Delta VL$ (in units of volts).

(Supplementary Note 4)

In the discharge lamp lighting device as described in Supplementary Note 3, the error log information is information that corresponds to flicker of the discharge lamp when the amount of change $\Delta VL$ satisfies:

$$\Delta VL \geq T \qquad \text{Formula 2:}$$

continuously for a first time interval or more.

(Supplementary Note 5)

In the discharge lamp lighting device as described in Supplementary Note 4, the first time interval is six hours or more.

(Supplementary Note 6)

In the discharge lamp lighting device as described in Supplementary Note 3, the error log information is information corresponding to cracking or rupture of the discharge lamp when the amount of change $\Delta VL$ satisfies:

$$T > \Delta VL \geq (3/10)T \qquad \text{Formula 3:}$$

continuously for a second time interval or more.

(Supplementary Note 7)

In the discharge lamp lighting device as described in Supplementary Note 6, the second time interval is 40 hours or more.

(Supplementary Note 8)

In the discharge lamp lighting device as described in Supplementary Note 2, the detection time interval is 2 hours, the predetermined value is 2 V, the predetermined number of times is 3, and the error log information is information corresponding to flicker of the discharge lamp.

(Supplementary Note 9)

In the discharge lamp lighting device as described in Supplementary Note 2, the detection time interval is 10 hours, the predetermined value is 3V, the predetermined number of times is 4, and the error log information is information corresponding to cracking or rupture of the discharge lamp.

(Supplementary Note 10)

In the discharge lamp lighting device as described in Supplementary Note 1, the control unit:
acquires the voltage detection value every two hours and compares the voltage detection value with the previously acquired voltage detection value; and when the lamp voltage has increased by at least 2V for three successive two-hour time intervals, stores in the storage unit error log information that includes the voltage detection value that was acquired last and information corresponding to flicker of the discharge lamp; and
acquires the voltage detection value every 10 hours and compares the voltage detection value with the previously acquired voltage detection value, and when the lamp voltage has increased by at least 3V for four successive ten-hour time intervals, stores in the storage unit error log information that includes the voltage detection value that was acquired last and information corresponding to cracking or rupture of the discharge lamp.

(Supplementary Note 11)

The discharge lamp lighting device as described in Supplementary Note 10 further includes a two-hour timer that measures two hours, and the control unit uses the two-hour timer both to acquire the voltage detection value every two hours and to acquire the voltage detection value every ten hours.

(Supplementary Note 12)

The discharge lamp lighting device as described in any one of Supplementary Notes 1 to 11 further includes an information output unit that supplies information, and when change of the lamp voltage indicates the voltage characteristic, the control unit causes warning information indicating a failure or warning signs of a failure of the discharge lamp to be supplied from the information output unit.

(Supplementary Note 13)

In the discharge lamp lighting device as described in any one of Supplementary Notes 1 to 12, the lamp drive unit generates alternating current that corresponds to the drive power and supplies this alternating current to the discharge lamp; and when change of the lamp voltage indicates the voltage characteristic, the control unit lowers the frequency of the alternating current that is supplied from the lamp drive unit.

(Supplementary Note 14)

The discharge lamp lighting device as described in Supplementary Note 13 further includes a current detection unit that detects the alternating current;
wherein:
the lamp drive unit has:
a DC/DC converter that converts input direct-current voltage to direct-current voltage of a designated voltage value; and
a DC/AC inverter that takes as input the direct-current voltage that was supplied from the DC/DC converter and that generates alternating current having a designated frequency and supplies the alternating current to the discharge lamp; and
the control unit calculates lamp power on the basis of the voltage detection value that is supplied from the voltage detection unit and a current detection value that is supplied from the current detection unit, controls the output voltage of the DC/DC converter such that the lamp power reaches a predetermined power, and when change of the lamp voltage indicates the voltage characteristic, lowers the frequency of the alternating current that is supplied from the DC/AC inverter.

(Supplementary Note 15)

The discharge lamp lighting device as described in Supplementary Note 14 further has:
a high-frequency generation unit that generates a high-frequency signal;
a first low-frequency generation unit that generates a first low-frequency signal having frequency that is lower than the high-frequency signal;
a second low-frequency generation unit that generates a second low-frequency signal having frequency that is lower than the first low-frequency signal; and
a switching unit that takes as input each of the high-frequency signal, the first low-frequency signal, and the second low-frequency signal and that selectively supplies one of these inputs; wherein:
the DC/AC inverter generates the alternating current having the frequency of the frequency signal that is supplied from the switching unit; and
at the time of a steady lighting operation, the control unit causes each of the outputs of the first and second low-frequency generation units to be periodically selected in a state in which the output of the high-frequency generation unit is selected, and when change of the lamp voltage indicates the voltage characteristic, causes the selection of the output of the second low-frequency generation unit over a predetermined interval.

(Supplementary Note 16)

The discharge lamp lighting device as described in Supplementary Note 14 or 15 further includes a console for designating a lamp power mode from among a plurality of lamp power modes in which the lamp power that is supplied to the discharge lamp differs; wherein:
the control unit both controls the output voltage of the DC/DC converter in accordance with the lamp power mode that has been designated in the console and stores in the storage unit the error log information for each lamp power mode.

(Supplementary Note 17)

A lamp failure detection method that is implemented in a discharge lamp lighting device that controls the lighting of a discharge lamp, the method having steps of:
detecting lamp voltage of the discharge lamp, and storing in the storage unit error log information that indicates the operating state of the discharge lamp when, on the basis of the voltage detection value, a change of the lamp voltage indicates a predetermined voltage characteristic.

(Supplementary Note 18)

A projector has:
a discharge lamp;
a discharge lamp lighting device as described in any one of Supplementary Notes 1 to 16 that lights the discharge lamp;
an image-forming unit that spatially modulates luminous flux from the discharge lamp on the basis of an input video signal to form an image; and
a projection optical system that projects the image that was formed in the image-forming unit.

(Supplementary Note 19)

The projector as described in Supplementary Note 18 forms an image that corresponds to the error log information in the image-forming unit.

The discharge lamp lighting device as described in Note 1 can be realized by applying the configuration described in the first or third exemplary embodiment. The discharge lamp lighting device described in Notes 2-17 can be realized by applying the configuration described in the first exemplary embodiment or the configuration described in the first and second exemplary embodiments.

EXPLANATION OF REFERENCE NUMBERS 1, 20 control unit
2 high-frequency generation unit
3, 4 low-frequency generation unit
5 switching unit
6, 23 voltage detection unit
7 current detection unit
8 timer
9, 21 storage unit
10 lamp drive unit
11 DC/DC converter
12 DC/AC inverter
13 high-voltage generation unit
14 console
15 information output unit
16 discharge lamp
22 light source drive unit
24 light source

The invention claimed is:

1. A discharge lamp lighting device that controls lighting of a discharge lamp, the discharge lamp lighting device comprising:
a storage unit that stores information;
a lamp drive unit that supplies drive power to said discharge lamp;
a voltage detection unit that detects a lamp voltage of said discharge lamp; and
a control unit that, on a basis of a voltage detection value that is supplied from said voltage detection unit, stores in said storage unit log information that indicates an operating state of said discharge lamp when a change of said lamp voltage indicates a predetermined voltage characteristic,
wherein said control unit acquires the voltage detection value for each detection time interval, compares the acquired voltage detection value with a previously acquired voltage detection value, and stores said log information in said storage unit when said lamp voltage has increased by a predetermined value or higher for a predetermined number of successive time intervals.

2. The discharge lamp lighting device as set forth in claim 1, wherein said predetermined voltage characteristic is a characteristic that satisfies a condition $\Delta VL \geq (3/10)T$,
where a time interval in which said detection time interval has continued, said predetermined number of successive time intervals is assumed to be determining time interval T (in units of hours), and an amount of change of said lamp voltage that has changed during said determining time interval T is assumed to be $\Delta VL$ (in units of volts), and which is meant that the amount of change of said lamp voltage $\Delta VL$ is set to be 3 volts or higher during the determining time interval T of 10 hours.

3. The discharge lamp lighting device as set forth in claim 2, wherein said log information is information that corresponds to flicker of said discharge lamp when said amount of change $\Delta VL$ satisfies a condition $\Delta VL \geq T$, which is meant that the amount of change of said lamp voltage $\Delta VL$ is set to be at a predetermined voltage level or higher during the determining time interval T, continuously for a first time interval or more.

4. The discharge lamp lighting device as set forth in claim 3, wherein said first time interval is six hours or more.

5. The discharge lamp lighting device as set forth in claim 2, wherein said log information is information corresponding to cracking or rupture of said discharge lamp when said amount of change $\Delta VL$ satisfies a condition $T > \Delta VL \geq T$, which is meant that the amount of change of said lamp voltage $\Delta VL$ is set to be 3 volts or higher during the determining time interval T of 10 hours, continuously for a second time interval or more.

6. The discharge lamp lighting device as set forth in claim 5, wherein said second time interval is 40 hours or more.

7. The discharge lamp lighting device as set forth in claim 1, wherein said detection time interval is 2 hours, said predetermined value is 2V, said predetermined number of successive time intervals is 3, and said log information is information corresponding to flicker of said discharge lamp.

8. The discharge lamp lighting device as set forth in claim 1, wherein said detection time interval is 10 hours, said predetermined value is 3V, said predetermined number of successive time intervals is 4, and said log information is information corresponding to cracking or rupture of said discharge lamp.

9. The discharge lamp lighting device as set forth in claim 1, wherein said control unit:
acquires said voltage detection value every two hours and compares said voltage detection value with the previously acquired voltage detection value, and when said lamp voltage has increased by at least 2V for three successive two-hour time intervals, stores in said storage unit log information that includes said voltage detection value that was acquired last and information corresponding to flicker of said discharge lamp; and
acquires said voltage detection value every 10 hours and compares said voltage detection value with the previously acquired voltage detection value, and when said lamp voltage has increased by at least 3V for four successive ten-hour time intervals, stores in said storage unit log information that includes said voltage detection value that was acquired last and information corresponding to cracking or rupture of said discharge lamp.

10. The discharge lamp lighting device as set forth in claim 9, further comprising a two-hour timer that measures two hours,
wherein said control unit uses said two-hour timer to acquire said voltage detection value every two hours and to acquire said voltage detection value every ten hours.

11. The discharge lamp lighting device as set forth in claim 1, further comprising an information output unit that supplies information,
wherein, when change of said lamp voltage indicates said predetermined voltage characteristic, said control unit causes information indicating a failure or warning signs of a failure of said discharge lamp to be supplied from said information output unit.

12. The discharge lamp lighting device as set forth in claim 1, wherein said lamp drive unit generates an alternating current that corresponds to said drive power and supplies the alternating current to said discharge lamp, and
wherein, when change of said lamp voltage indicates said predetermined voltage characteristic, said control unit lowers a frequency of said alternating current that is supplied from said lamp drive unit.

13. The discharge lamp lighting device as set forth in claim 12, further comprising a current detection unit that detects said alternating current, wherein said lamp drive unit comprises:
a DC/DC converter that converts an input direct-current voltage to a direct-current voltage of a designated voltage value; and
a DC/AC inverter that takes as input the direct-current voltage that is supplied from said DC/DC converter and that generates an alternating current having a designated frequency and supplies said alternating current to said discharge lamp, and
wherein said control unit calculates lamp power on the basis of the voltage detection value that is supplied from said voltage detection unit and a current detection value that is supplied from said current detection unit, controls the output voltage of said DC/DC converter such that the lamp power reaches a predetermined power, and when change of said lamp voltage indicates said voltage characteristic, lowers the frequency of said alternating current that is supplied from said DC/AC inverter.

14. The discharge lamp lighting device as set forth in claim 13, further comprising:
a high-frequency generation unit that generates a high-frequency signal;
a first low-frequency generation unit that generates a first low-frequency signal having frequency that is lower than said high-frequency signal;
a second low-frequency generation unit that generates a second low-frequency signal having frequency that is lower than said first low-frequency signal; and
a switching unit that takes as input each of said high-frequency signal, said first low-frequency signal, and said second low-frequency signal and that selectively supplies one of these inputs;
wherein said DC/AC inverter generates said alternating current having the frequency of the frequency signal that is supplied from said switching unit, and
wherein, at a time of a steady lighting operation, said control unit causes each of the outputs of said first and second low-frequency generation units to be periodically selected in said switching unit in a state in which the output of said high-frequency generation unit is selected, and when change of said lamp voltage indicates said voltage characteristic, causes the selection of the output of said second low-frequency generation unit over a predetermined interval.

15. The discharge lamp lighting device as set forth in claim 13, further comprising a console for designating a lamp power mode from among a plurality of lamp power modes each having different lamp power that is supplied to said discharge lamp,
wherein said control unit controls the output voltage of said DC/DC converter in accordance with the lamp power mode that has been designated in said console and stores in said storage unit said log information for each lamp power mode.

16. A projector, comprising:
the discharge lamp;
a discharge lamp lighting device as set forth in claim 1 that lights said discharge lamp;
an image-forming unit that spatially modulates luminous flux from said discharge lamp on a basis of an input video signal to form an image; and
a projection optical system that projects an image that is formed in said image-forming unit.

17. The projector as set forth in claim 16, wherein an image that corresponds to said log information is formed in said image-forming unit.

18. The discharge lamp lighting device as set forth in claim 1, wherein, when change of said lamp voltage indicates said predetermined voltage characteristic, said control unit lowers a frequency of an alternating current that is supplied from said lamp drive unit.

19. The discharge lamp lighting device as set forth in claim 1, wherein, when change of said lamp voltage indicates said predetermined voltage characteristic, said control unit provides information indicating a failure or warning signs of a failure of said discharge lamp.

20. A lamp failure detection method that is implemented in a discharge lamp lighting device that controls lighting of a discharge lamp, said method comprising:
detecting lamp voltage of said discharge lamp, and storing in a storage unit log information that indicates an operating state of said discharge lamp when, on a basis of a voltage detection value, a change of said lamp voltage indicates a predetermined voltage characteristic; and
acquiring the voltage detection value for each detection time interval comparing the acquired voltage detection value with a previously acquired voltage detection value, and storing said log information in a storage unit when said lamp voltage has increased by a predetermined value or more for a predetermined number of successive time intervals.

* * * * *